Feb. 25, 1936.                    J. G. BINS                      2,032,248
                             DOG BED OR THE LIKE
                            Filed March 4, 1935
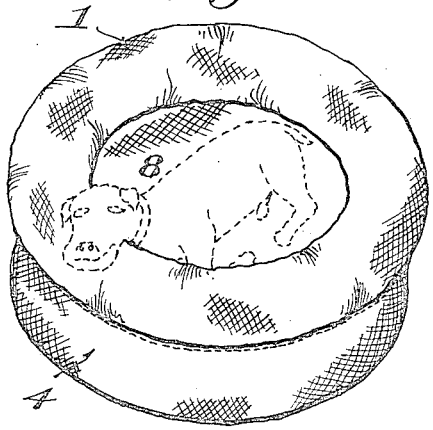
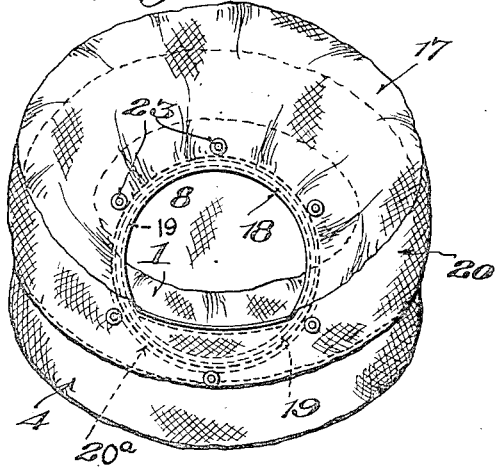
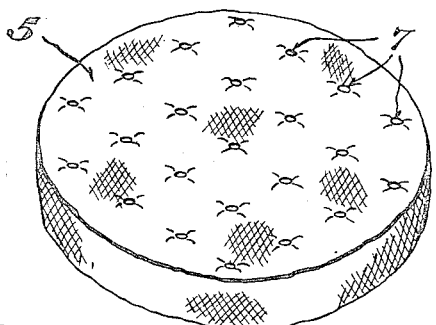
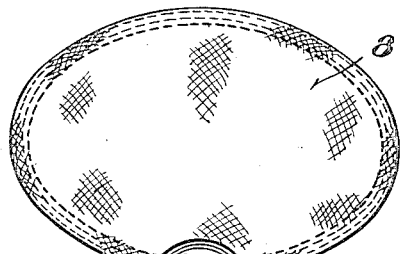
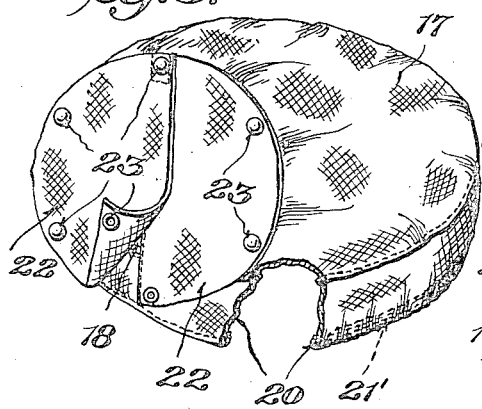
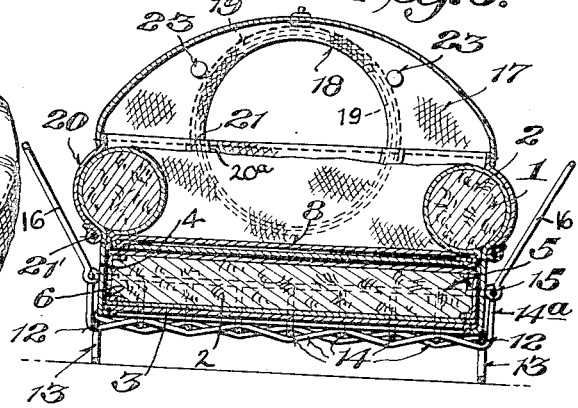

Patented Feb. 25, 1936

2,032,248

UNITED STATES PATENT OFFICE 2,032,248

DOG BED OR THE LIKE

John G. Bins, St. Paul, Minn.

Application March 4, 1935, Serial No. 9,338

20 Claims. (Cl. 119—1)

This invention is a novel improvement in beds for dogs, cats and other pets, and the principal objects of the invention are to provide an inexpensive portable bed for animal pets, which bed is adapted for use primarily in the home, although same being portable may be readily carried in a car, automobile, or other conveyance; also to provide a bed of circular, oval, oblong, or other shape which may conform with the natural contour of a dog or other pet when curled up in the act of sleeping, said bed comprising briefly an annular bolster, a reversible mattress within the bolster, a reversible mattress cover within the bolster above the mattress, means for securing the parts together, and a cowl-shaped cover adapted to be applied over the bed for use in cold weather, said cover having an arched curtained opening therein at one side through which the pet may pass in and out when the cover is in use, the cover being removable for warm weather; also to provide a low stand for preventing the bed from contacting directly with the surface of the floor or ground.

I will explain the invention with reference to the accompanying drawing which illustrates one practical embodiment thereof to enable others to adopt and use the same; and I will summarize in the claims the novel features of construction, and novel combinations of parts, for which protection is desired.

In said drawing:—

Fig. 1 is a perspective view of a bed of circular shape with the cover detached, and showing in dotted lines a dog therein in sleeping position.

Fig. 2 is a perspective view of the bed with the cover attached, but with the curtains of the cover opening removed.

Fig. 3 is a perspective view of the mattress member, detached.

Fig. 4 is a perspective view of the mattress cover, detached, showing the opening in the periphery for insertion of the split steel wire ring.

Fig. 5 is a perspective view of the cover for the bed detached, and showing the curtains applied to the opening in the cover.

Fig. 6 is a transverse section through the members of the bed showing the mattress and mattress cover in place in the pocket, and showing the bed mounted upon the stand.

As shown, the bed comprises an annular bolster 1 of general circular, oval, oblong, or other desired shape preferably formed by stitching the side edges of a strip of fabric of desired length together to form a tube, then filling the tube with cotton 2 or the like, preferably using a cotton packer having a fan or blower. After the tube is filled one end is sewed up, and the sewed end of the tube inserted in the open end and the overlapping end portions of the tube sewed together, thereby forming a circular, oval, or oblong stuffed bolster. A base sheet of fabric 3, of approximately the same shape and size as the outer periphery of the annular bolster 1 has an annular band of fabric 4 stitched to its periphery and also stitched to the outer cover of the bolster 1 to connect the base sheet 3 to the bolster, the width of the band 4 being substantially the same as the thickness of the mattress 5 which is fitted into the pocket 6 (Fig. 6) formed between the lower end of bolster 1 and the base sheet.

The mattress 5 (Fig. 3) is of size and shape to suit the pocket 6 of the bolster member, and may be circular, oval, oblong or other desired shape. The mattress is preferably reversible and formed of upper and lower fabric members united at their peripheries by an annular band, the mattress being filled with cotton 2 or the like, preferably blown therein by a cotton packer, or may be filled with other suitable stuffing or filling material. Preferably the mattress is tufted, or upholstered with buttons 7 in the usual manner. The mattress is inserted through the upper side of the bolster 1 and forced into the pocket 6 formed between the annular bolster and the base sheet 3 as shown in Fig. 6, which operation is accomplished by slightly distorting the mattress and bolster; and the mattress when inserted in pocket 6 fills the pocket and forms a support for the annular bolster.

In the pocket 6 immediately above mattress 5 is a reversible mattress cover 8 (Fig. 4) consisting of two sheets of fabric substantially of same size and shape as the mattress 5, and having their peripheries stitched together except for a short length 9 which is left unstitched for the purpose of permitting insertion and removal of a split ring 10 of relatively stiff steel wire between the sheets. Ring 10 is of the same diameter as the mattress cover 8 and has on one end a socket member 11 consisting of a length of small tubing welded or otherwise secured thereto adapted to receive the other free end of the wire. The socket end 11 of the split ring 10 is inserted into the mattress cover 8 through the opening 9, and the wire worked around until both ends thereof appear through the opening 9; and the free end of the wire is then inserted in socket 11. The mattress cover 8 with the wire stiffener 10 therein is then distorted and inserted down through the upper end of the bolster member 1 and disposed between mattress 5 and the underside of the annular bolster as shown in Fig. 6, the flexibility of the wire 10 readily permitting the mattress cover to be sufficiently distorted for this purpose. When the stiffening wire 10 is secured in the mattress cover the sheets forming the cover will be held taut so that they cannot wrinkle, and when the mattress cover is inserted in the pocket 6 between mattress 5 and the annular bolster the sheets of the cover cannot readily become disengaged from the bed due to the wire 10 which maintains the mattress cover in proper shape. The reversible cover 8 will keep the mattress 5 clean, and may be readily removed when soiled and a new or clean cover inserted in its place.

If desired a stand shown in Fig. 6 may be provided to prevent the bed from directly contacting with the floor or ground, which stand preferably consists of a grille of a circular, oval, or oblong shape, having an annular frame member 12 of stiff wire provided with three or more offset bent portions 13 adapted to form short legs. Frame member 12 has a plurality of light cross wires 14 welded or otherwise secured to the frame member 12, the outer ends of the wires 14 being bent upwardly as shown at 14a. A wire guard rail 15 adapted to surround the lower end of the bed is mounted on the upturned ends 14a of wires 14 to prevent the bed from slipping off the stand. Preferably two hand-holds 16 are formed on the sides of the stand, diametrically opposed to each other, for the purpose of moving the stand with the bed thereon from place to place.

For use in cold weather I provide a removable cover (Figs. 2, 5, 6) consisting of a cowl-shaped member 17 having an arched opening 18 in its front maintained by a steel wire loop 19 of sufficient size for the dog, cat, or other pet to pass therethrough, said loop 19 being stitched to the edges of the opening 18. The cowl 17 is of size and shape to cover the exterior of annular bolster 1, and stitched to its periphery is a depending annular band 20 of somewhat larger diameter than bolster 1 provided with elastic inserts 21' so that when the band 20 is applied around the exterior of the bolster as shown in Fig. 6 the elastic inserts 21 will contract the band around the bolster to maintain the same in place, while the opening 18 through the cover is maintained by the wire loop 19 so that the dog or cat can readily pass into the bed through the opening. The lower portion of the loop 19 which lies adjacent the band 20 is secured thereto by an arcuate tape 20a (Fig. 2) stitched to the inner face of the band 20 over the wire loop 19; and as the lower portion of the loop 19 is disposed between the bolster 1 and the band 20, the loop 19 is thereby maintained in substantially vertical position when the cover 17 is applied to the bed.

The arched opening 17 for the cover 16 of the dog bed may be provided with curtains 22 (Fig. 5) consisting of two semi-circular sections adapted to overlap at the center of the opening 18. Suitable snap fasteners 23 are provided on the curtain sections 22 and on the material of the cover 17 adjacent the opening 18 for maintaining the curtain sections 22 closed when desired. When the sections 22 are not fastened the dog or other pet can readily pass in and out of the opening 18. In warm weather the cover 17 is not needed and may be removed.

As shown in Fig. 1 the upper end of the bolster will generally be utilized by the dog or other pet as a pillow, although a separate pillow may be provided. The beds may be made in different sizes and shapes, and of various materials or fabrics.

I claim:—

1. A bed for pets comprising a mattress; and an annular bolster on said mattress having an annular pocket receiving the edge portions of the mattress for connecting said members together.

2. A bed for pets comprising a mattress; an annular bolster on said mattress; means for connecting said members together; and an extensible cover around the side edges of said bolster having an opening therein for the passage therethrough of the pet.

3. In a bed as set forth in claim 2, said cover having a band secured to its lower edge slightly larger in diameter than the exterior of the bolster; means for contracting the band around the bolster; and a stiffener secured to the edges of the opening.

4. In combination with a bed as set forth in claim 2, a portable stand comprising a grille having legs; a guard rail on the grille surrounding the mattress; and handles extending from the grille.

5. A bed for pets comprising a mattress; a mattress cover stretched over said mattress; an annular bolster on said mattress cover; means for connecting said members together; and a flexible extensible cover around the side edges of said annular bolster having an opening therein for the passage therethrough of the pet.

6. In a bed as set forth in claim 5, said mattress cover comprising superimposed sheets of substantially the same size and shape as the mattress stitched together at their edges, and a split stiffening ring removably inserted between the sheets maintaining the same taut.

7. In a bed as set forth in claim 5, said cover having a band secured to its lower edge slightly larger in diameter than the exterior of the bolster; means for contracting the band around the bolster; a stiffener secured to the edges of the opening; and means for closing said opening.

8. In combination with a bed as set forth in claim 5, a portable stand comprising a grille having legs; a guard rail on the grille surrounding the bed; and handles extending from the grille.

9. A bed for pets, comprising an annular bolster, a base sheet secured to the outer sides of the bolster and forming with the bottom of the bolster an annular pocket; and a mattress having its edge portions filling the annular pocket and its central portion forming the bottom of the space bounded by the said bolster.

10. A bed for pets, comprising an annular bolster, a base sheet secured to the outer sides of the bolster and forming with the bottom of the bolster an annular pocket; a mattress having its edge portions filling the annular pocket and its central portion forming the bottom of the space bounded by the said bolster; and a mattress cover in said pocket above the mattress.

11. In a bed as set forth in claim 10, said mattress cover comprising superimposed sheets of substantially the same size and shape as the mattress stitched together at their edges, and a split steel wire stiffening ring removably inserted between the sheets maintaining the same taut.

12. A bed for pets, comprising a flexible annular bolster, a base sheet secured to the outer sides of the bolster and forming with the bottom of the bolster an annular pocket; a mattress having its edge portions filling the annular pocket and its central portion forming the bottom of the space bounded by the said bolster; and a cover for the bed engaging the outer sides of the bolster and having an opening therein for the passage therethrough of the pet.

13. In a bed as set forth in claim 12, said cover having a band secured to its lower edge slightly larger in diameter than the exterior of the bolster; means for contracting the band around the bolster; and a stiffener secured to the edges of the opening.

14. A bed for pets, comprising an annular bolster, a base sheet secured to the outer sides of the bolster and forming with the bottom of the bolster an annular pocket; a mattress having its edge portions filling the annular pocket and its central portion forming the bottom of the space bounded by the said bolster; a mattress cover in said pocket above the mattress; and a flexible cover for the bed engaging the outer sides of the bolster and having an opening at one side for the passage therethrough of the pet.

15. In a bed as set forth in claim 14, said mattress cover comprising superimposed sheets of substantially the same size and shape as the mattress stitched together at their edges; and a split stiffening ring removably inserted between the sheets maintaining the same taut.

16. In a bed as set forth in claim 14, said flexable cover having a band secured to its lower edge of slightly larger size than the exterior of the bolster; means for contracting the band around the bolster; and a stiffening loop secured to the edges of the opening in the cover and to the band.

17. A bed for pets, comprising a stuffed annular bolster, a base sheet secured to the outer sides of the bolster and forming with the bottom of the bolster an annular pocket; an upholstered reversible mattress having its edge portions filling the annular pocket and its central portion forming the bottom of the space bounded by the said bolster; a flexible reversible mattress cover in said pocket above the mattress; and a flexible cowl-shaped cover for the bed engaging the outer sides of the bolster and having an opening at one side for the passage therethrough of the pet.

18. In a bed as set forth in claim 17, said mattress cover comprising superimposed sheets of substantially the same size and shape as the mattress stitched together at their edges, said cover having an opening in its edge, and a removable split stiffening ring between the sheets insertible and removable through the opening, said ring maintaining the sheets of the cover taut.

19. In a bed as set forth in claim 17, said cowl-shaped cover having a band secured to its lower edge of slightly larger size than the exterior of the annular bolster; elastic inserts in said band for contracting the band around the bolster; a stiffening loop secured to the edges of the opening in the cover and to the band; and removable curtains adapted to close said opening.

20. In combination with a bed as set forth in claim 17, a portable stand comprising a grille having legs; a guard rail on the grille surrounding the bed; and handles extending from the grille.

JOHN G. BINS.